United States Patent
Ichikawa et al.

(10) Patent No.: US 11,716,049 B2
(45) Date of Patent: Aug. 1, 2023

(54) ROTATING MACHINE POWER CONVERSION DEVICE

(71) Applicant: Mitsubishi Electric Corporation, Tokyo (JP)

(72) Inventors: Takafumi Ichikawa, Tokyo (JP); Yoshihiko Kimpara, Tokyo (JP); Noriyuki Wada, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 418 days.

(21) Appl. No.: 16/982,697

(22) PCT Filed: Apr. 27, 2018

(86) PCT No.: PCT/JP2018/017135
§ 371 (c)(1),
(2) Date: Sep. 21, 2020

(87) PCT Pub. No.: WO2019/207752
PCT Pub. Date: Oct. 31, 2019

(65) Prior Publication Data
US 2021/0006193 A1 Jan. 7, 2021

(51) Int. Cl.
*H02P 29/02* (2016.01)
*H02P 29/028* (2016.01)
(Continued)

(52) U.S. Cl.
CPC ............ *H02P 29/028* (2013.01); *B60L 3/003* (2013.01); *B60L 50/51* (2019.02); *H02H 7/1227* (2013.01);
(Continued)

(58) Field of Classification Search
CPC .. H02P 29/028; H02P 6/28; H02P 5/46; H02P 27/06; B60L 50/51; B60L 3/003;
(Continued)

(56) References Cited

U.S. PATENT DOCUMENTS

2007/0249461 A1 10/2007 Tsuji et al.
2008/0054839 A1 3/2008 Sasaki et al.
(Continued)

FOREIGN PATENT DOCUMENTS

JP 2007-312588 A 11/2007
JP 2008-067429 A 3/2008
(Continued)

OTHER PUBLICATIONS

Communication dated Sep. 14, 2021, issued by the Japanese Patent Office in application No. 2020-515419.
(Continued)

*Primary Examiner* — Rafael O De Leon Domenech
(74) *Attorney, Agent, or Firm* — Sughrue Mion, PLLC; Richard C. Turner (57) ABSTRACT

A rotating machine power conversion device is obtained which achieves operational continuation in a rotational speed range in which the operational continuation is enabled, even when a single phase of an electrical power conversion device made of switching devices causes a disconnection or turn-off failure. The rotating machine power conversion device comprises: a normality-case/abnormality-case current control device selection device for transferring between a normality-case current control device and an abnormality-case current control device in accordance with a determination result of an abnormality determination device; and an abnormality-case current control device/power conversion halt device selection device, using a rotational speed calculation device, for transferring
(Continued)

between the abnormality-case current control device used when a rotational speed is lower than that being prespecified, and the power conversion halt device used when a rotational speed is higher than that being prespecified.

15 Claims, 7 Drawing Sheets

(51) Int. Cl.
| | |
|---|---|
| *H02K 11/33* | (2016.01) |
| *H02P 6/28* | (2016.01) |
| *B60L 50/51* | (2019.01) |
| *B60L 3/00* | (2019.01) |
| *H02H 7/122* | (2006.01) |
| *H02M 1/32* | (2007.01) |
| *H02P 5/46* | (2006.01) |
| *H02P 23/14* | (2006.01) |
| *H02P 27/06* | (2006.01) |

(52) U.S. Cl.
CPC ............. *H02K 11/33* (2016.01); *H02M 1/32* (2013.01); *H02P 5/46* (2013.01); *H02P 6/28* (2016.02); *H02P 23/14* (2013.01); *H02P 27/06* (2013.01); *B60L 2210/40* (2013.01); *H02M 1/325* (2021.05)

(58) Field of Classification Search
CPC ..... B60L 2210/40; H02M 1/325; H02M 1/32; H02K 11/33; H02H 7/1227
See application file for complete search history.

(56) References Cited

U.S. PATENT DOCUMENTS

| | | | |
|---|---|---|---|
| 2008/0290829 A1 | 11/2008 | Suzuki | |
| 2011/0140642 A1* | 6/2011 | Kono | .................... B60L 15/025 318/139 |
| 2014/0132190 A1 | 5/2014 | Kitano | |
| 2017/0250645 A1* | 8/2017 | Tateda | ...................... H02P 6/24 |
| 2017/0274781 A1* | 9/2017 | Sawaoka | .................. H02P 6/28 |
| 2018/0152128 A1* | 5/2018 | Araki | ...................... H02P 27/06 |
| 2019/0013761 A1* | 1/2019 | Seo | ......................... H02P 27/08 |
| 2020/0050176 A1* | 2/2020 | Saegusa | ............. G05B 19/4141 |
| 2020/0366230 A1* | 11/2020 | Iwai | .......................... H02P 6/16 |

FOREIGN PATENT DOCUMENTS

| | | |
|---|---|---|
| JP | 2008-211910 A | 9/2008 |
| JP | 2016-215675 A | 12/2016 |
| WO | 2013/008313 A1 | 1/2013 |

OTHER PUBLICATIONS

International Search Report of PCT/JP2018/017135 dated Jul. 24, 2018 [PCT/ISA/210].
Written Opinion of PCT/JP2018/017135 dated Jul. 24, 2018 [PCT/ISA/237].
Office Action dated Apr. 17, 2023 from the Chinese Patent Office in Application No. 201880092608.8.

* cited by examiner

ROTATING MACHINE POWER CONVERSION DEVICE

CROSS REFERENCE TO RELATED APPLICATIONS

This application is a National Stage of International Application No. PCT/JP2018/017135, filed Apr. 27, 2018.

TECHNICAL FIELD

The present application relates to the field of a rotating machine power conversion device for performing a drive control on a three-phase alternating current (AC) rotating machine.

BACKGROUND ART

Conventionally, known are electric motor-operated vehicles such as an electric automotive vehicle, a hybrid automotive vehicle and the like in each of which a three-phase AC rotating machine(s) acts as a driving source; in those electric motor-operated vehicles, vehicle-running drive torque is produced by performing power running operations of a three-phase AC rotating machine(s) at the time of vehicle-running, and regenerative brake torque, produced by performing regenerative vehicle-running operations of the three-phase AC rotating machine(s) at the time of braking.

Here, a drive system of an electric motor-operated vehicle is constituted of a direct current (DC) power source made of a secondary battery such as a lithium ion battery or the like, an electrical power conversion means, made of a capacitor and a plurality of semiconductor switches (switching devices), which is connected to the DC power source, and a three-phase AC rotating machine(s) connected to the electrical power conversion means as a load.

The electrical power conversion means converts DC power of a DC power source into predetermined AC power by turning on or off a plurality of semiconductor switches at a predetermined switching frequency, and adjusts torque of a three-phase AC rotating machine being a load and the number of revolutions thereof. In addition, the three-phase AC rotating machine operates as an electric power generator depending on an operational condition(s), so that regenerative power generated according to the electric power generation is charged into the DC power source. Note that, as a three-phase AC rotating machine applied to an electric motor-operated vehicle, a permanent-magnet three-phase synchronous motor having good efficiency is in frequent use.

In a drive system utilizing a three-phase synchronous motor, an electrical power conversion means is configured in such a manner that series-connected circuits of three phases (three pairs) being connected in series with upper-side switching devices and lower-side switching devices each other are connected in parallel with a DC power source, and that respective midpoints of the series-connected circuits of three phases are individually connected to the windings of the phase-U of the three-phase synchronous motor, the phase-V thereof and the phase-W thereof.

In addition, by sequentially turning on and off the switching devices provided for each phase of the electrical power conversion means, AC power is supplied to the each phase of the three-phase synchronous motor in which the phases differ by the quantity of 120 degrees from one another, so that the three-phase synchronous motor is driven. Hereinafter, unless otherwise specifically noted, a three-phase AC rotating machine designates a three-phase synchronous motor.

Moreover, a technology is already disclosed in which, even when a single phase of an electrical power conversion means made of switching devices in a rotating machine power conversion device causes a disconnection or turn-off failure, the rotating machine power conversion device is continuously operated (for example, refer to Patent Document 1, Patent Document 2).

RELATED ART DOCUMENTS

Patent Documents

[Patent Document 1] Japanese Patent Laid-Open No. 2008-67429
[Patent Document 2] Japanese Patent Laid-Open No. 2008-211910

SUMMARY OF THE INVENTION

Problems to be Solved by the Invention

As described above, a technology has been already disclosed in which, even when a single phase of an electrical power conversion means made of switching devices in a rotating machine power conversion device causes a turn-off failure, the rotating machine power conversion device is continuously operated. In Patent Document 1, a rotating machine power conversion device is introduced in which, even when a single phase of switching devices causes a turn-off failure, operational continuation is made possible without additionally providing a switching device; the rotating machine power conversion device is applied to an electric brake device. In addition, in Patent Document 2, an electric current control scheme is proposed in which phase-current instruction values are formed in accordance with a phase whose turn-off failure is caused in an electrical power conversion means, which is applied to electric power steering. However, when a rotating machine power conversion device proposed by Patent Document 1 and that by Patent Document 2 is implemented in an electric motor-operated vehicle, it is feared that an electric current control cannot be performed, and that the operational continuation cannot be achieved, when a single phase of the electrical power conversion means causes a turn-off failure and also when a rotational speed of a three-phase AC rotating machine increases.

In addition, when a single phase of the electrical power conversion means causes a turn-off failure, torque of a three-phase AC rotating machine vibrates, and thus, it is feared that a vehicle occupant(s) of the electric motor-operated vehicle gets a feeling of discomfort.

Moreover, when a single phase of the electrical power conversion means causes a turn-off failure and also when a rotational speed of a three-phase AC rotating machine increases, there arises a problem in that excessive electric power regeneration into a DC power source, regenerative torque and abnormal torque are caused, when a voltage in which the three-phase AC rotating machine generates results in exceeding that of the DC power source for the electrical power conversion means.

The present application has been directed at disclosing technologies for solving those problems as described above, and an object of the invention is to obtain a rotating machine power conversion device capable of continuing its operations even when a single phase of an electrical power conversion means made of switching devices in the rotating machine power conversion device causes a disconnection or turn-off failure.

Means for Solving the Problems

A rotating machine power conversion device disclosed in the present application includes a rotating machine power conversion device, being mounted between a three-phase AC rotating machine and a DC power source, and having an electrical power conversion means in which series-connected circuits of three phases connected in series with upper-side switching devices and lower-side switching devices each other are connected in parallel with the DC power source and in which midpoints between the upper-side switching devices and the lower-side switching devices in each of the series-connected circuits are individually connected to windings of each phase of the three-phase AC rotating machine, for converting into AC power thereto DC power from the DC power source; and the rotating machine power conversion device comprises: a rotational speed calculation means for calculating a rotational speed of the three-phase AC rotating machine; an abnormality determination means for determining abnormality of single phase turn-off failure in the electrical power conversion means; and an electric current control means for determining a value of phase voltage instruction into the electrical power conversion means, wherein the electric current control means comprises: a normality-case current control unit used at the time when the electrical power conversion means is normal; an abnormality-case current control unit used at the time when the electrical power conversion means is abnormal; a power conversion halt unit for halting the electrical power conversion means; a normality-case/abnormality-case current control unit selection device for transferring between the normality-case current control unit and the abnormality-case current control unit in accordance with a determination result of the abnormality determination means; and an abnormality-case current control unit/power conversion halt unit selection device for transferring between the abnormality-case current control unit used in a case where a calculation result of the rotational speed calculation means is smaller than a prespecified rotational speed determined in advance, and the power conversion halt unit used in a case where a calculation result of the rotational speed calculation means is larger than a prespecified rotational speed determined in advance.

Effects of the Invention

According to the rotating machine power conversion device disclosed in the present application, the abnormality-case current control unit is used in a case where a single phase turn-off failure is caused in the electrical power conversion means so that the abnormality is determined, whereby, by using the abnormality-case current control unit only in a range of rotational speeds in which an electric current control can be performed by the abnormality-case current control unit, operational continuation can be achieved in a rotational speed range in which the operational continuation is enabled.

EMBODIMENTS FOR CARRYING OUT THE INVENTION

Hereinafter, the explanation will be made referring to the drawings for preferred exemplary embodiments of rotating machine power conversion devices. Note that, in each of the figures, the explanation will be made for the same or corresponding items, portions or parts by designating the same reference numerals and symbols.

Embodiment 1

Figure 1:
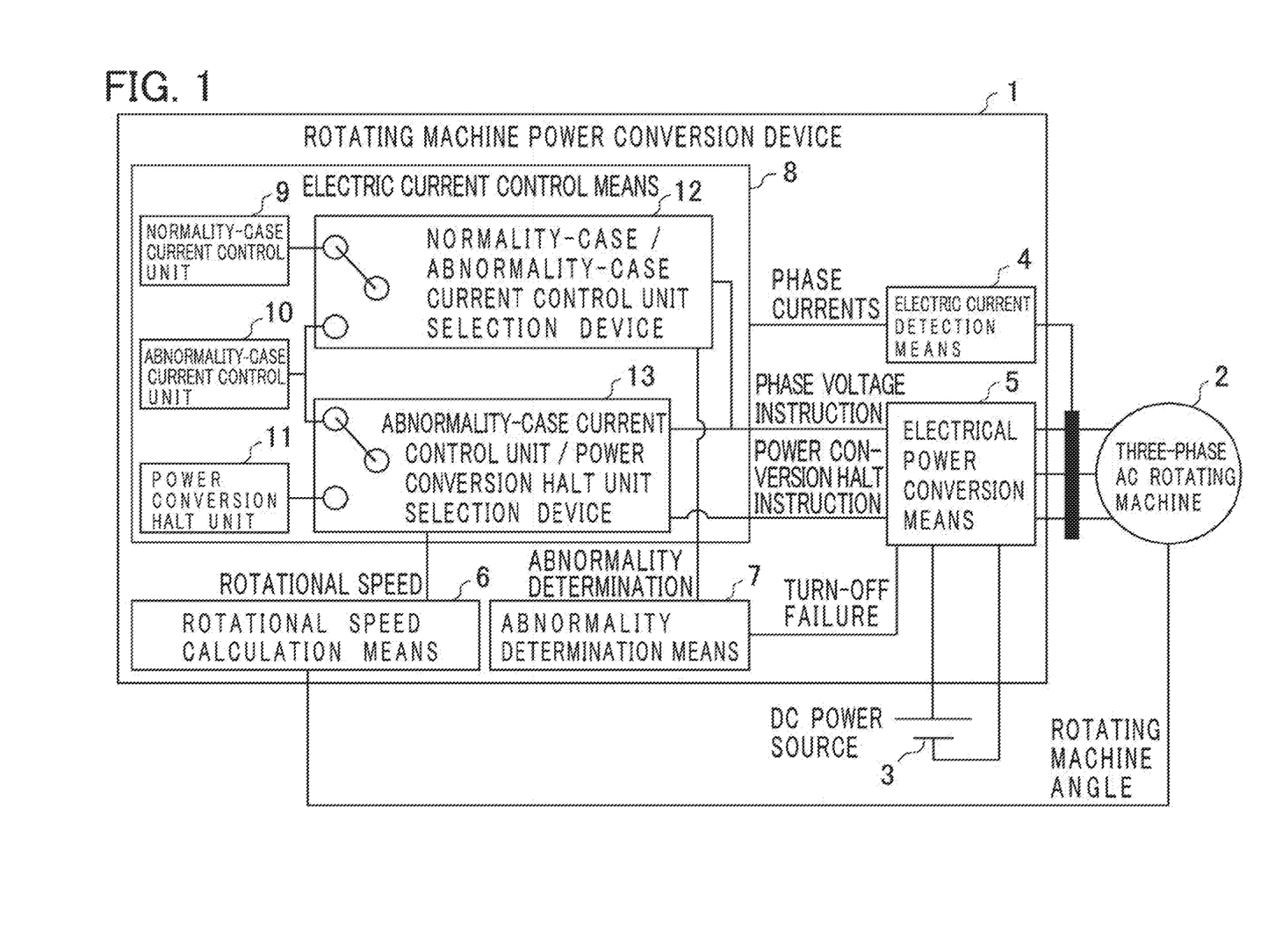
FIG. 1 is a schematic diagram illustrating a rotating machine power conversion device and a three-phase AC rotating machine according to Embodiment 1.

FIG. 1 is a schematic diagram of a rotating machine power conversion device 1 and a three-phase AC rotating machine 2 according to Embodiment 1. The rotating machine power conversion device 1 is a rotating machine power conversion device, being connected between the three-phase AC rotating machine 2 and a DC power source 3, for supplying electric power into the three-phase AC rotating machine 2 by converting into AC power thereto DC power from the DC power source 3; and the rotating machine power conversion device is constituted of an electrical power conversion means 5 for converting the DC power from the DC power source 3 into AC power to the three-phase AC rotating machine 2, an electric current detection means 4 for detecting phase currents flowing into/from the three-phase AC rotating machine 2, a rotational speed calculation means 6 for calculating a rotational speed based on a rotating machine angle from the three-phase AC rotating machine 2, an electric current control means 8 for outputting a phase voltage instruction or a power conversion halt instruction into the electrical power conversion means 5, and an abnormality determination means 7 for detecting and confirming a single phase turn-off failure of the electrical power conversion means 5, and for determining abnormality. Note that, in the electrical power conversion means 5, series-connected circuits of three phases being connected in series with upper-side switching devices and lower-side switching devices each other are connected in parallel with the DC power source, and the midpoints between the upper-side switching devices and the lower-side switching devices in each of the series-connected circuits are individually connected to the windings of the three-phase AC rotating machine.

In addition, the electric current control means 8 is constituted of a normality-case current control unit 9 used at the time of normality, an abnormality-case current control unit 10 used at the time of abnormality, a power conversion halt unit 11 for halting the electrical power conversion means 5, a normality-case/abnormality-case current control unit selection device 12 for transferring between the normality-case current control unit 9 and the abnormality-case current control unit 10 according to the abnormality determination means 7, and an abnormality-case current control unit/power conversion halt unit selection device 13 for transferring between the abnormality-case current control unit 10 used in a case where a calculation result of the rotational speed calculation means 6 is smaller than a prespecified rotational speed determined in advance, and the power conversion halt unit 11 used in a case where a calculation result of the rotational speed calculation means 6 is larger than a pre-specified rotational speed determined in advance.

Figure 2:
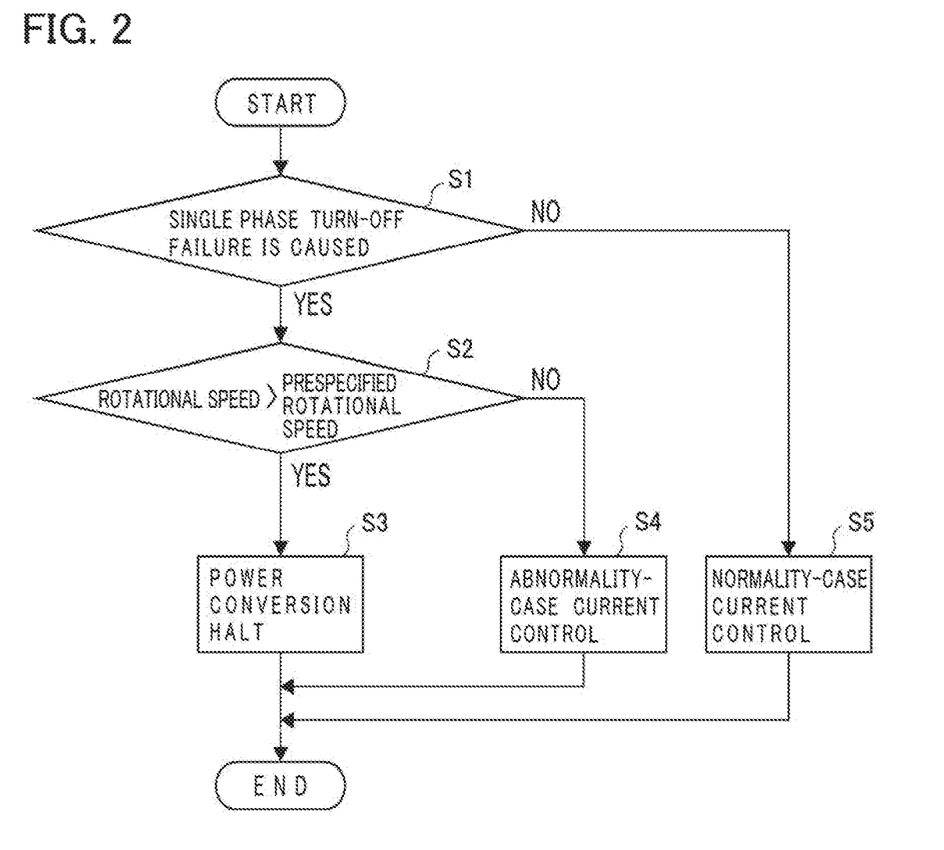
FIG. 2 is a diagram illustrating an operations flowchart of an electric current control means for the rotating machine power conversion device according to Embodiment 1.

FIG. 2 is an operations flowchart of the electric current control means 8 in the rotating machine power conversion device 1. In a case where a single phase turn-off failure is caused in the electrical power conversion means 5 (Step S1), and also where a rotational speed calculated by the rotational speed calculation means 6 is higher than a prespecified rotational speed determined in advance (Step S2), the power conversion halt unit 11 is used, so that the power conversion is halted (Step S3). In addition, at Step S2, in a case where determination is made so that a rotational speed is lower than a prespecified rotational speed determined in advance, the abnormality-case current control unit 10 is used, so that an abnormality-case current control is performed (Step S4). Moreover, at Step S1, in a case where determination is made so that single phase turn-off failure is not caused in the electrical power conversion means 5, the normality-case current control unit 9 is used, so that a normality-case current control is performed (Step S5).

According to the configuration of FIG. 1 and the operations flowchart of FIG. 2, the abnormality-case current control unit 10 is used in a case where a single phase turn-off failure is caused in the electrical power conversion means 5, and where abnormality is determined according to the abnormality determination means 7, whereby the abnormality-case current control unit 10 is used only in a range of rotational speeds in which an electric current control can be performed by the abnormality-case current control unit 10, so that operational continuation can be achieved in a rotational speed range in which the operational continuation is enabled.

In addition, the abnormality-case current control unit 10 is used in a case where a single phase turn-off failure is caused in the electrical power conversion means 5, and also where a rotational speed is lower than a prespecified rotational speed; meanwhile, the abnormality-case current control unit 10 and the power conversion halt unit 11 are alternately used. By alternately using the abnormality-case current control unit 10 and the power conversion halt unit 11, torque vibration is caused when the abnormality-case current control unit 10 is used; however, a time during which the torque vibration is caused can be reduced.

Moreover, the abnormality-case current control unit 10 is used in a case where a single phase turn-off failure is caused in the electrical power conversion means 5, and also where a rotational speed is lower than a pre specified rotational speed; meanwhile, a ratio of using the abnormality-case current control unit 10 and the power conversion halt unit 11 is changed in accordance with circumstantial conditions. It is needless to say that the circumstantial conditions stand for torque of the three-phase AC rotating machine 2, a rotational speed thereof and a temperature(s) thereof. By changing a ratio of using the abnormality-case current control unit 10 and the power conversion halt unit 11 therebetween in accordance with the circumstantial conditions, the degree of reduction of a time during which torque vibration is caused can be changed in accordance with torque of the three-phase AC rotating machine 2, a rotational speed thereof and a temperature(s) thereof.

Embodiment 2

Figure 3:
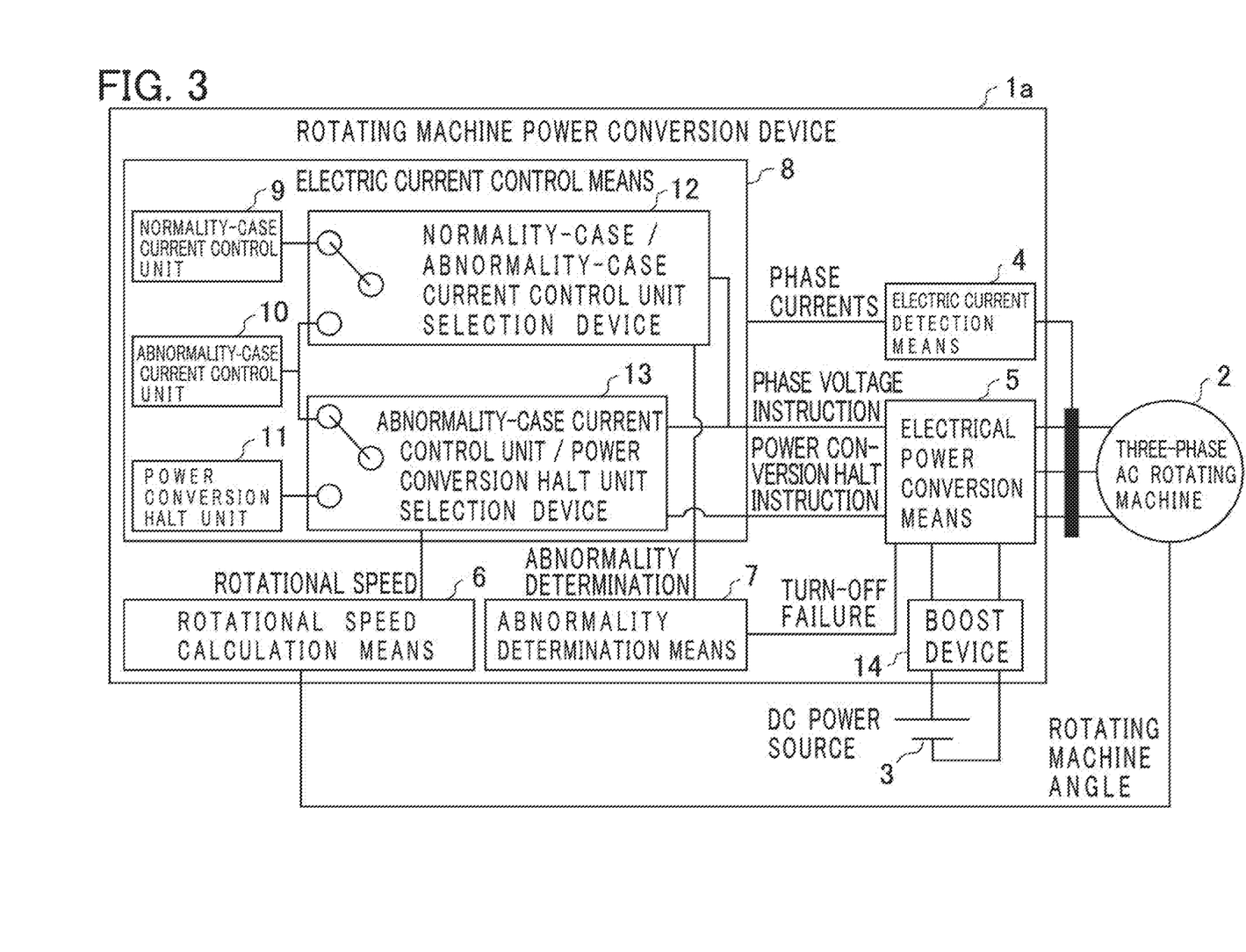
FIG. 3 is a schematic diagram illustrating a rotating machine power conversion device and a three-phase AC rotating machine according to Embodiment 2.

FIG. 3 is a schematic diagram of a rotating machine power conversion device 1$a$ and the three-phase AC rotating machine 2 according to Embodiment 2, and its basic configuration is constituted similarly to that in Embodiment 1; however, a step-up or boost device 14 is provided for the electrical power conversion means 5, and the boost device 14 is mounted between the DC power source 3 and the electrical power conversion means 5.

Figure 4:
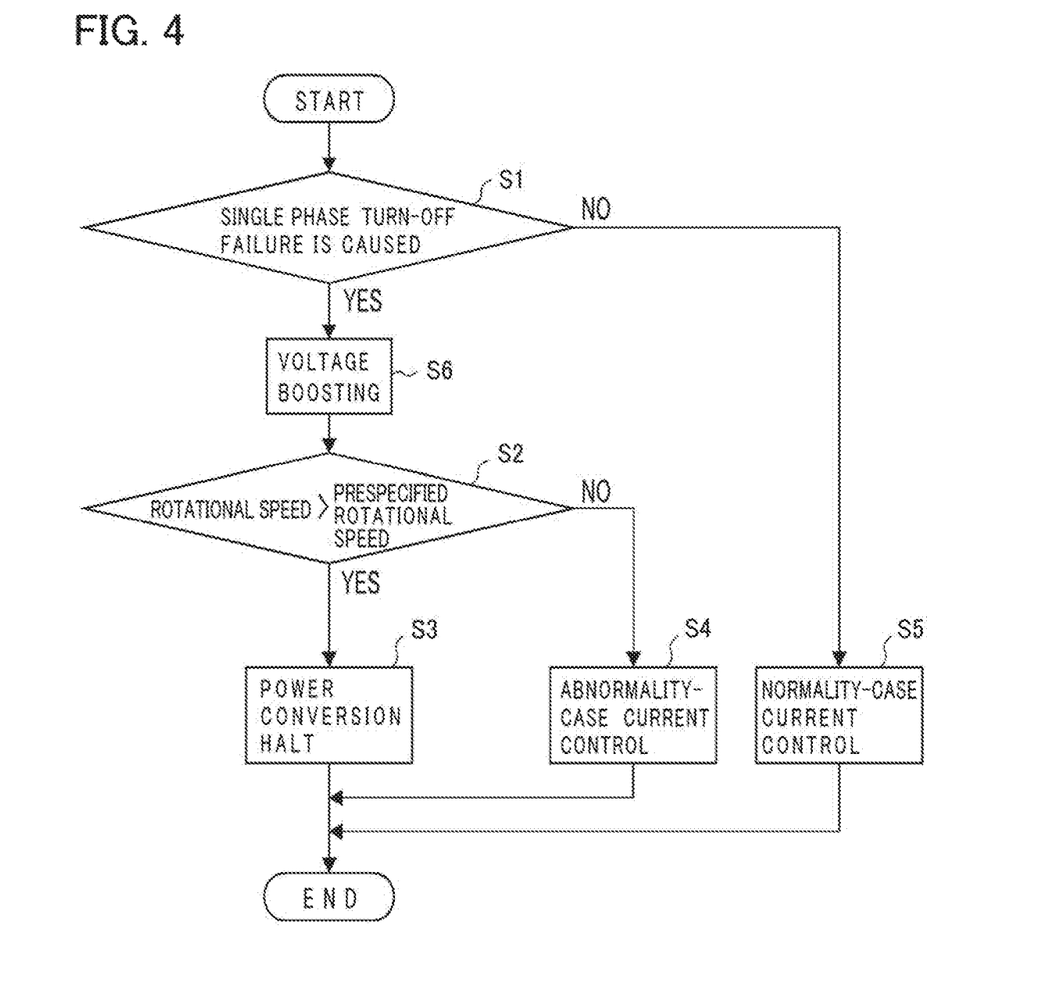
FIG. 4 is a diagram illustrating an operations flowchart of an electric current control means for the rotating machine power conversion device according to Embodiment 2.

FIG. 4 is an operations flowchart of the electric current control means 8 in the rotating machine power conversion device 1$a$ having a step-up or boost function according to Embodiment 2.

In a case where determination is made so that a single phase turn-off failure is caused in the electrical power conversion means 5 (Step S1), a step-up or boost operation of the electrical power conversion means 5 is performed by means of the boost device 14 (Step S6); next, at Step S2, in a case where a rotational speed calculated by the rotational speed calculation means 6 is higher than a prespecified rotational speed determined in advance (Step S2), the power conversion halt unit 11 is used, so that the power conversion is halted (Step S3). In addition, at Step S2, in a case where determination is made so that a rotational speed is lower than a prespecified rotational speed determined in advance, the abnormality-case current control unit 10 is used, so that an abnormality-case current control is performed (Step S4). Moreover, at Step S1, in a case where determination is made so that single phase turn-off failure is not caused in the electrical power conversion means 5, a normality-case current control is performed by using the normality-case current control unit 9 (Step S5).

According to the configuration of FIG. 3 and the operations flowchart of FIG. 4, in a case where a single phase turn-off failure is caused in the electrical power conversion means 5, and where abnormality is determined according to the abnormality determination means 7, a voltage of the electrical power conversion means is increased so that its voltage becomes higher than that at its normal time, whereby a rotational speed of the three-phase AC rotating machine 2 increases, so that it becomes possible to prevent braking force due to regenerative torque being produced when a voltage in which the three-phase AC rotating machine 2 generates is to exceed a DC voltage of the DC power source 3, and so, the production of abnormal torque can be prevented from occurring.

Embodiment 3

Figure 5:
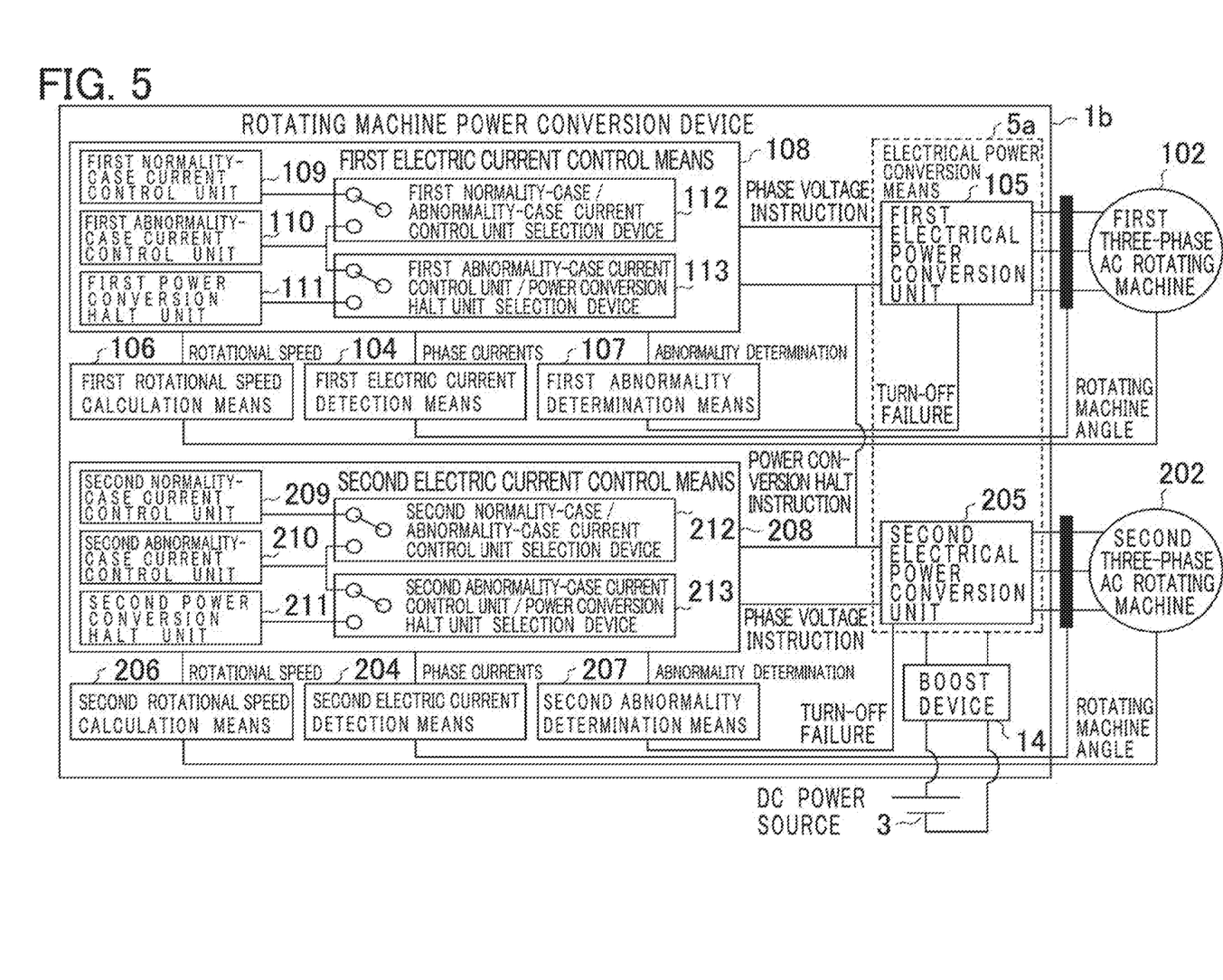
FIG. 5 is a schematic diagram illustrating a rotating machine power conversion device and three-phase AC rotating machines according to Embodiment 3.

FIG. 5 is a schematic diagram of a rotating machine power conversion device 1$b$, a three-phase AC rotating machine 102 and a three-phase AC rotating machine 202 according to Embodiment 3. Embodiment 3 is an exemplary embodiment in which a plurality of three-phase AC rotating machines becomes a subject matter under consideration, so that a basic configuration of an electrical power conversion means and basic configurations of electric current control means are constituted similarly to those in Embodiment 2; and so, the rotating machine power conversion device 1$b$ is connected to the plurality of three-phase AC rotating machines 102 and 202. The operations of the rotating machine power conversion device 1b in Embodiment 3 are basically the same as or similar to those in Embodiment 2.

An electrical power conversion means 5a made of switching devices is constituted of a first electrical power conversion unit 105 and a second electrical power conversion unit 205, and is capable of individually driving the plurality of three-phase AC rotating machines 102 and 202. A configuration is adopted in which a first electric current control means 108 outputs a phase voltage instruction into the first electrical power conversion unit 105, and a second electric current control means 208 outputs a phase voltage instruction into the second electrical power conversion unit 205; meanwhile, a configuration is adopted in which a first power conversion halt unit 111 and a second power conversion halt unit 211 perform their outputs individually into both of the first electrical power conversion unit 105 and the second electrical power conversion unit 205.

According to the configuration of FIG. 5, when the first power conversion halt unit 111 or the second power conversion halt unit 211 operates, the power conversion into the plurality of three-phase AC rotating machines 102 and 202 can be halted, so that it is possible to prevent an overvoltage and/or an overcurrent due to electric power unbalance among the DC power source 3, the boost device 14, the plurality of three-phase AC rotating machines 102 and 202, and the electrical power conversion means 5a.

Embodiment 4

Figure 6:
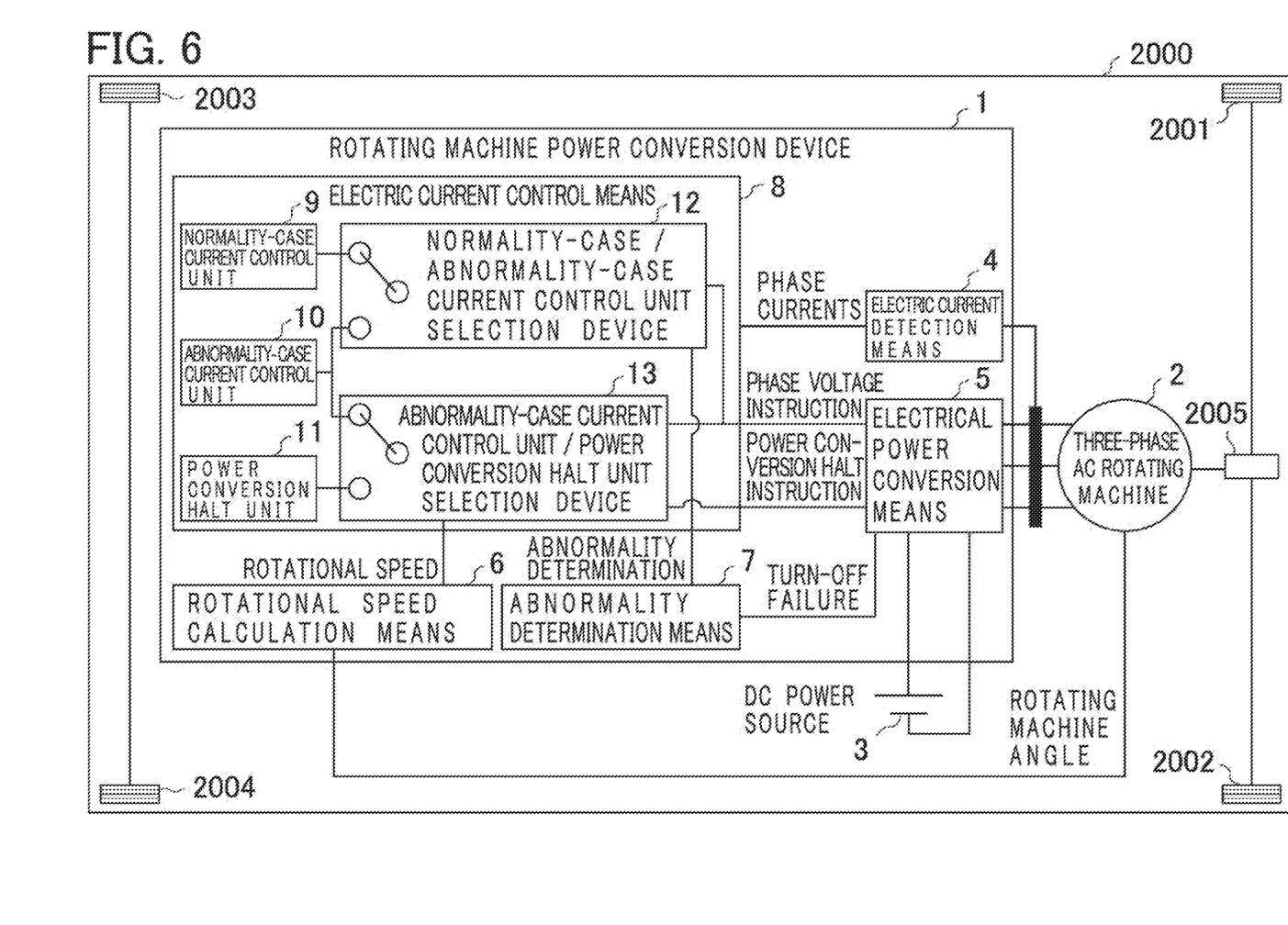
FIG. 6 is a schematic diagram illustrating an implementation example of a rotating machine power conversion device according to Embodiment 4.

FIG. 6 is a conceptual diagram outlining an example in which the rotating machine power conversion device 1 illustrated in FIG. 1 according to Embodiment 1 is implemented in an electric motor-operated vehicle. It should be noted that, as for another embodiment, either the rotating machine power conversion device 1a illustrated in FIG. 3 according to Embodiment 2 or the rotating machine power conversion device 1b illustrated in FIG. 5 according to Embodiment 3 can be used for an electric motor-operated vehicle. Also in Embodiment 4, the rotating machine power conversion device performs the operations equivalent or similar to those in the other embodiments.

As outlined in FIG. 6, the rotating machine power conversion device 1 is a rotating machine power conversion device which is mounted on a motor vehicle 2000 being an electric motor-operated vehicle, for driving the three-phase AC rotating machine 2 by using the electric power of the DC power source 3 (for example, a high-voltage battery). The motor vehicle 2000 has a final gear 2005 connected by a shaft to the three-phase AC rotating machine 2, and a front-wheel left side tire 2001 and a front-wheel right side tire 2002 each of which is connected by another shaft to the final gear 2005 and mounted toward the front of the motor vehicle. In addition, toward the rear of the motor vehicle 2000, a rear-wheel left side tire 2003 and a rear-wheel right side tire 2004 connected by another shaft to each other are placed.

In Embodiment 4 in which the rotating machine power conversion device in Embodiment 1 is applied to an electric motor-operated vehicle, even when a single phase turn-off failure is caused in the electrical power conversion means 5 of the electric motor-operated vehicle so that abnormality is determined according to the abnormality determination means 7, it is possible to provide vehicle-running assist by means of power running torque in a rotational speed range in which an electric current control can be performed by the abnormality-case current control unit 10, so that the operational continuation is made possible.

In addition, in a case where a single phase turn-off failure is caused in the electrical power conversion means 5 of an electric motor-operated vehicle, and also where a rotational speed is lower than a prespecified rotational speed, the abnormality-case current control unit 10 is used; meanwhile, the abnormality-case current control unit 10 and the power conversion halt unit 11 are alternately used. By alternately using the abnormality-case current control unit 10 and the power conversion halt unit 11, torque vibration is caused when the abnormality-case current control unit 10 is used; however, a time during which the torque vibration is caused can be reduced, whereby a feeling of discomfort to a vehicle occupant(s) of the electric motor-operated vehicle is lowered.

Moreover, in an embodiment in which the rotating machine power conversion device 1a in Embodiment 2 illustrated in FIG. 3 is applied to an electric motor-operated vehicle, when a single phase turn-off failure is caused in the electrical power conversion means 5 of the electric motor-operated vehicle and also when abnormality is determined according to the abnormality determination means 7, a voltage of the electrical power conversion means is increased so that its voltage becomes higher than that at its normal time, whereby a rotational speed of the three-phase AC rotating machine 2 for the electric motor-operated vehicle increases, so that it becomes possible to prevent braking force due to regenerative torque being produced when a voltage in which the three-phase AC rotating machine 2 generates is to exceed a DC voltage of the DC power source 3, and so, the production of abnormal torque can be prevented from occurring.

Furthermore, in a case of embodiment in which the rotating machine power conversion device 1b in Embodiment 3 illustrated in FIG. 5 is adopted to an electric motor-operated vehicle, the electrical power conversion means 5a of the electric motor-operated vehicle can drive the plurality of three-phase AC rotating machines 102 and 202, so that it is possible to prevent an overvoltage and/or an overcurrent due to electric power unbalance among the DC power source 3 in the electric motor-operated vehicle, the boost device 14 therein, the plurality of three-phase AC rotating machines 102 and 202 therein, and the electrical power conversion means 5a therein.

In the present application, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the invention of the application concerned. For example, there arise cases which are included as a case in which at least one constituent element is modified, added or eliminated, and further a case in which at least one constituent element is extracted and then combined with a constituent element(s) of another embodiment.

Figure 7:
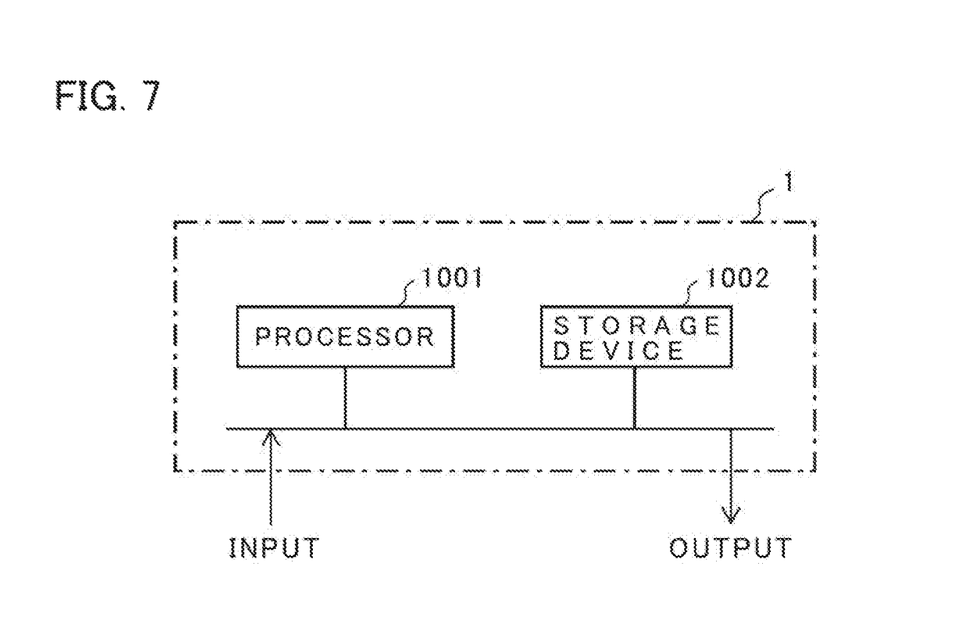
FIG. 7 is a diagram showing an example of a hardware configuration for the rotating machine power conversion device in the embodiments each.

It should be noted that, as an example of hardware is illustrated in FIG. 7, the rotating machine power conversion device 1 is constituted of a processor 1001 and a storage device 1002. The storage device is provided with a volatile storage device of a random access memory (RAM) or the like, and with a nonvolatile auxiliary storage device of a flash memory or the like, which are not shown in the figure. In addition, in place of the flash memory, an auxiliary storage device of a hard disk may be provided with. The processor 1001 executes a program(s) inputted from the storage device 1002. In this case, the program(s) is inputted into the processor 1001 from the auxiliary storage device by way of the volatile storage device. Moreover, the processor 1001 may output its data of a calculated result(s) or the like into the volatile storage device of the storage device 1002, or may store the data into the auxiliary storage device by way of the volatile storage device. The same also applies to the rotating machine power conversion devices 1a and 1b.

EXPLANATION OF NUMERALS AND SYMBOLS

Numeral "1" designates a rotating machine power conversion device; "4," electric current detection means; "5," electrical power conversion means; "6," rotational speed calculation means; "7," abnormality determination means; "8," electric current control means; "9," normality-case current control unit; "10," abnormality-case current control unit; "11," power conversion halt unit; "12," normality-case/abnormality-case current control unit selection device; and "13," abnormality-case current control unit/power conversion halt unit selection device.

What is claimed is:
1. A rotating machine power conversion device, being mounted between a three-phase alternating-current rotating machine and a direct-current power source, and having an electrical power conversion device in which series-connected circuits of three phases connected in series with upper-side switching devices and lower-side switching devices each other are connected in parallel with the direct-current power source and in which midpoints between the upper-side switching devices and the lower-side switching devices in each of the series-connected circuits are individually connected to windings of each phase of the three-phase alternating-current rotating machine, for converting into alternating-current power thereto direct-current power from the direct-current power source, the rotating machine power conversion device comprising:
 a rotational speed calculation device for calculating a rotational speed of the three-phase alternating-current rotating machine;
 an abnormality determination device for determining abnormality of single phase turn-off failure in the electrical power conversion device; and
 an electric current control device for determining a value of phase voltage instruction into the electrical power conversion device, wherein
 said electric current control device comprises:
  a normality-case current control device used at a time when the electrical power conversion device is normal;
  an abnormality-case current control device used at a time when the electrical power conversion device is abnormal;
  a power conversion halt device for halting the electrical power conversion device;
  a normality-case/abnormality-case current control device selection device for transferring between the normality-case current control device and the abnormality-case current control device in accordance with a determination result of the abnormality determination device; and
  an abnormality-case current control device/power conversion halt device selection device for transferring between the abnormality-case current control device used in a case where a calculation result of the rotational speed calculation device is smaller than a prespecified rotational speed determined in advance, and said power conversion halt device used in a case where a calculation result of the rotational speed calculation device is larger than a prespecified rotational speed determined in advance.
2. The rotating machine power conversion device as set forth in claim 1, wherein the abnormality-case current control device/power conversion halt device selection device also uses the abnormality-case current control device in a case where the rotational speed is lower than the prespecified rotational speed, while the abnormality-case current control device/power conversion halt device selection device alternately selects the abnormality-case current control device and said power conversion halt devices.
3. The rotating machine power conversion device as set forth in claim 2, wherein the abnormality-case current control device/power conversion halt device selection device changes a ratio of selecting the abnormality-case current control device and said power conversion halt device therebetween.
4. The rotating machine power conversion device as set forth in claim 3, further comprising a boost device for increasing an output of the electrical power conversion device so that its voltage becomes higher than that at its normal time in a case of abnormality of single phase turn-off failure in the electrical power conversion device.
5. The rotating machine power conversion device as set forth in claim 3, wherein
 the rotating machine power conversion device comprises the electrical power conversion device with respect to a plurality of three-phase alternating-current rotating machines and said electric current control device therewith;
 the electrical power conversion device has a plurality of electrical power conversion devices capable of individually driving the plurality of three-phase alternating-current rotating machines; and
 said power conversion halt device outputs a power conversion halt instruction into the plurality of electrical power conversion devices.
6. The rotating machine power conversion device as set forth in claim 3, wherein the rotating machine power conversion device is mounted on an electric motor-operated vehicle, for supplying electric power to a three-phase alternating-current rotating machine for use in driving the electric motor-operated vehicle.
7. The rotating machine power conversion device as set forth in claim 2, further comprising a boost device for increasing an output of the electrical power conversion device so that its voltage becomes higher than that at its normal time in a case of abnormality of single phase turn-off failure in the electrical power conversion device.
8. The rotating machine power conversion device as set forth in claim 7, wherein the rotating machine power conversion device is mounted on an electric motor-operated vehicle, for supplying electric power to a three-phase alternating-current rotating machine for use in driving the electric motor-operated vehicle.
9. The rotating machine power conversion device as set forth in claim 2, wherein
 the rotating machine power conversion device comprises the electrical power conversion device with respect to a plurality of three-phase alternating-current rotating machines and said electric current control device therewith;

the electrical power conversion device has a plurality of electrical power conversion devices capable of individually driving the plurality of three-phase alternating-current rotating machines; and said power conversion halt device outputs a power conversion halt instruction into the plurality of electrical power conversion devices.

10. The rotating machine power conversion device as set forth in claim 2, wherein the rotating machine power conversion device is mounted on an electric motor-operated vehicle, for supplying electric power to a three-phase alternating-current rotating machine for use in driving the electric motor-operated vehicle.

11. The rotating machine power conversion device as set forth in claim 1, further comprising a boost device for increasing an output of the electrical power conversion device so that its voltage becomes higher than that at its normal time in a case of abnormality of single phase turn-off failure in the electrical power conversion device.

12. The rotating machine power conversion device as set forth in claim 11, wherein the rotating machine power conversion device comprises the electrical power conversion device with respect to a plurality of three-phase alternating-current rotating machines and said electric current control device therewith;

the electrical power conversion device has a plurality of electrical power conversion devices capable of individually driving the plurality of three-phase alternating-current rotating machines; and said power conversion halt device outputs a power conversion halt instruction into the plurality of electrical power conversion devices.

13. The rotating machine power conversion device as set forth in claim 11, wherein the rotating machine power conversion device is mounted on an electric motor-operated vehicle, for supplying electric power to a three-phase alternating-current rotating machine for use in driving the electric motor-operated vehicle.

14. The rotating machine power conversion device as set forth in claim 1, wherein the rotating machine power conversion device comprises the electrical power conversion device with respect to a plurality of three-phase alternating-current rotating machines and said electric current control device therewith;

the electrical power conversion device has a plurality of electrical power conversion devices capable of individually driving the plurality of three-phase alternating-current rotating machines; and said power conversion halt device outputs a power conversion halt instruction into the plurality of electrical power conversion devices.

15. The rotating machine power conversion device as set forth in claim 1, wherein the rotating machine power conversion device is mounted on an electric motor-operated vehicle, for supplying electric power to a three-phase alternating-current rotating machine for use in driving the electric motor-operated vehicle.

* * * * *